(12) United States Patent
Hardy

(10) Patent No.: US 9,438,587 B2
(45) Date of Patent: Sep. 6, 2016

(54) SYSTEM AND METHOD FOR USER AUTHENTICATION

(71) Applicant: Philip Hardy, Jacksonville, FL (US)

(72) Inventor: Philip Hardy, Jacksonville, FL (US)

(73) Assignee: Philip Hardy, Jacksonville, FL (US)

( * ) Notice: Subject to any disclaimer, the term of this patent is extended or adjusted under 35 U.S.C. 154(b) by 0 days.

(21) Appl. No.: 14/283,891

(22) Filed: May 21, 2014

(65) Prior Publication Data

US 2015/0172264 A1 Jun. 18, 2015

Related U.S. Application Data

(60) Provisional application No. 61/915,614, filed on Dec. 13, 2013.

(51) Int. Cl.
| | |
|---|---|
| H04L 29/06 | (2006.01) |
| G06F 21/34 | (2013.01) |
| H04W 4/00 | (2009.01) |
| G06F 21/30 | (2013.01) |
| G06F 21/31 | (2013.01) |
| G06F 21/35 | (2013.01) |

(52) U.S. Cl.
CPC ......... *H04L 63/0853* (2013.01); *G06F 21/34* (2013.01); *H04L 63/107* (2013.01); *H04W 4/008* (2013.01); *G06F 21/30* (2013.01); *G06F 21/31* (2013.01); *G06F 21/35* (2013.01); *H04L 63/08* (2013.01)

(58) Field of Classification Search
CPC .... G06F 21/10; G06F 21/6245; G06F 21/62; G06F 21/6209; G06F 21/31; G06F 21/60; G06F 21/6218; G06F 21/34; G06F 21/30; G06F 21/35; H04L 9/0872; H04L 63/10; H04L 63/101; H04L 63/0853; H04L 63/08; H04L 63/107; H04W 4/008
See application file for complete search history.

(56) References Cited

U.S. PATENT DOCUMENTS

| | | | |
|---|---|---|---|
| 7,069,444 B2 | 6/2006 | Lowensohn et al. | |
| 7,378,939 B2 | 5/2008 | Sengupta et al. | |
| 7,748,636 B2 | 7/2010 | Finn | |
| 8,045,961 B2 | 10/2011 | Ayed et al. | |
| 8,112,066 B2 | 2/2012 | Ayed | |
| 8,467,770 B1 | 6/2013 | Ayed | |
| 8,478,196 B1 | 7/2013 | Hewinson | |
| 8,516,562 B2 | 8/2013 | Headley | |
| 8,625,796 B1 | 1/2014 | Ayed | |
| 2007/0069030 A1* | 3/2007 | Sauerwein, Jr. ..... | G06Q 10/083 235/462.46 |

(Continued)

OTHER PUBLICATIONS

"Securing the Desktop with XyLoc and KSI", Ensure Technologies, http://ensuretech.com/press-releases/securing-the-desktop-with-xyloc-and-ksi/, Feb. 18, 2012.

(Continued)

*Primary Examiner* — Morshed Mehedi
*Assistant Examiner* — Ayoub Alata

(57) ABSTRACT

Disclosed are a system and method for controlling a user log in and log out process. The system may include the use of a near field communication ("NFC") transmitter, a Bluetooth transmitter, or an RFID transmitter worn or carried by the user, such as by embedding the transmitter in a fob, bracelet or ID badge, and a receiver, which may be connected to the computer, which receives user data from the transmitter. The computer may be equipped with software modules (e.g., an operating system or application) that would extract user data from the receiver in order to manage the log in and log out process based on the location of the user.

1 Claim, 3 Drawing Sheets

(56) References Cited

U.S. PATENT DOCUMENTS

2007/0290791 A1   12/2007  Batra
2009/0210940 A1    8/2009  Dean
2012/0191980 A1*  7/2012  Kennedy ............ G06F 21/6236
                                                         713/183
2013/0244615 A1    9/2013  Miller
2013/0309971 A1* 11/2013  Kiukkonen ........... H04L 63/107
                                                         455/41.2

OTHER PUBLICATIONS

"Wireless lock", Wikipedia, http://en.wikipedia.org/wiki/Wireless_lock, Apr. 26, 2013.
"RFID Reader and Touch Chip Biometric Keyboard", KSI Keyboards, http://ksikeyboards.com/items/san-a-key-dual-factor-keyboard/, Dec. 31, 2014.

* cited by examiner

SYSTEM AND METHOD FOR USER AUTHENTICATION

CROSS-REFERENCE TO RELATED APPLICATIONS

This application claims the benefit of U.S. Provisional Application Ser. No. 61/915,614, filed Dec. 13, 2013, the disclosure of which is hereby incorporated herein by reference in its entirety.

FIELD OF THE INVENTION

The present invention relates to the field of secure user authentication. Specifically, the present invention is directed to a method and system for detecting the presence of a user in the vicinity of a computer and for authenticating the user or logging the user out of a session.

DESCRIPTION OF THE RELATED ART

Background

Presently there is a need for added security with regard to the use of computers in the work place. On a daily basis, computers in industries such as health care, education, and defense have required time outs which cause the computer to log out the user after a predetermined amount of time (e.g., specified number of minutes of inactivity). Log outs are forced to prevent unauthorized access to the computer. However, frequent log outs prevent users from completing tasks in an efficient manner, which in turn results in the loss of untold numbers of dollars due to loss of productivity. Accordingly, there is a need in the art for a system where users can still use computers without interruptions caused by the log out process taking place after every few minutes of inactivity.

In a scenario where several users share a particular computer, the logging in and out process enables the correct attribution of specific activity to a specific user. Unfortunately, the process of logging in and out on multiple occasions per hour is so time consuming, that the need to get tasks completed overrides other concerns. Thus, another problem in the art involves a first person logging into a computer session in a given day, but never logging out during that day, and resulting in the erroneous attribution of all daily activity to that first user. Accordingly, there is also a need in the art for a system which effectively logs out the user whenever the user is away from the computer, and logs the user back in whenever the user returns to the vicinity of the computer.

Prior art systems have attempted to solve the problems in the art described above with limited success. For example, a number of hospitals across the United States use a system referred to as the "Tap in-Tap out" system. This system, however, requires the user to actively apply his or her ID badge to a sensor attached to the computer. After the badge makes contact with the sensor, the computer will allow the person carrying the badge to log in after entering a password. This is typically required on first logging in within any 24 hour period. At the completion of the log in process, users can operate the computer. After applying the ID badge to the sensor again, the computer session is terminated. However, if the user steps away from the computer without "tapping out," that computer can still be accessed by unauthorized persons, and any activity on that computer will be erroneously attributed to the person who failed to "tap out."

In view of the foregoing, there is an additional need in the art for a system that enables an authorized user to continue to use the computer without interruption, without a forced log out process based on a time limit; that logs out the user or locks the computer when the user leaves the vicinity of the computer; that returns the computer to a state corresponding to its latest session for that user, with a minimum delay, when the authorized user returns to the vicinity of the computer; and that performs all these activities without the need for any manual entry on the part of the user.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One embodiment includes a computer-implemented method and system for controlling a user log in and log out process. The system may include the use of a near field communication ("NFC") transmitter, a near field electromagnetic transmitter, or an RFID transmitter worn or carried by the user, such as by embedding the transmitter in a fob, bracelet or ID badge, and a receiver, which may be connected to the computer. The computer may be equipped with software modules (e.g., an operating system or application) that would extract user data from the receiver in order to manage the log in and log out process based on the location of the user.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF ILLUSTRATIVE EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be implemented as a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to illustrations of methods, systems, and computer program products according to embodiments of the invention. It will be understood that blocks of the illustrations, and combinations of blocks in the illustrations, can be implemented by computer program instructions, hardware devices, or a combination of both. These computer program instructions may be provided to a processor of a general purpose computer, special purpose computer, or other programmable data processing apparatus to produce a particular machine, such that the instructions, which execute via the processor of the computer or other programmable data processing apparatus, implement the functions specified in the block or blocks.

Embodiments of present invention may be implemented on one or more computing devices, including one or more servers, one or more client terminals, including computer terminals, a combination thereof, or on any of the myriad of computing devices currently known in the art, including without limitation, personal computers, laptops, notebooks, tablet computers, touch pads (such as the Apple iPad, SmartPad Android tablet, etc.), multi-touch devices, smart phones, personal digital assistants, other multi-function devices, stand-alone kiosks, etc. An exemplary computing device for implementing a computational device is illustrated in FIG. 1.

Figure 1:
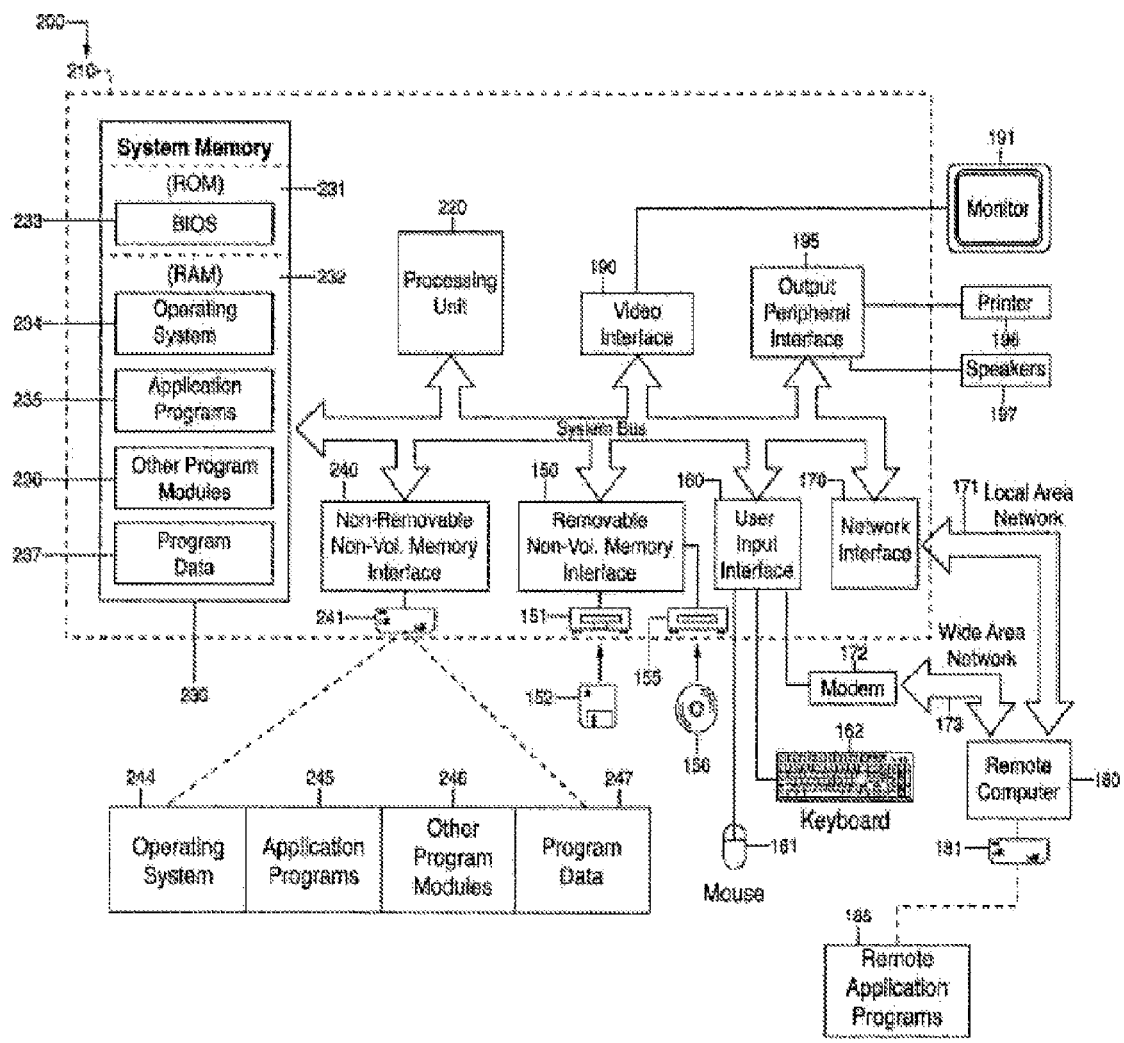
FIG. 1 illustrates an exemplary system that may be used for implementing the disclosed application, in accordance with one embodiment.

FIG. 1 illustrates an example of a suitable computing system environment 200 on which features of the invention may be implemented. The computing system environment 200 is only one example of a suitable computing environment and is not intended to suggest any limitation as to the scope of use or functionality of the invention. Neither should the computing environment 200 be interpreted as having any requirement relating to any one or combination of components illustrated in the exemplary operating environment 200.

The invention is operational with numerous other computing system environments or configurations. Examples of well known computing systems, environments, and/or configurations that may be suitable for use with the invention include, but are not limited to, personal computers, server computers, hand-held, notebook or laptop devices, touch pads, multi-touch devices, smart phones, other multi-function devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by one or more computing devices. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system that may be used for implementing the invention includes a computing device 210 which may be used for implementing a client, server, mobile device or other suitable environment for the invention. Components of computing device 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 210 typically includes a variety of computer readable media. Computer readable media may be defined as any available media that may be accessed by computing device 210 and includes both volatile and nonvolatile media, removable and non-removable media. By way of example, and not limitation, computer readable media may include computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 210. Combinations of the any of the above should also be included within the scope of computer readable media.

The system memory 230 may include computer storage media in the form of volatile and/or nonvolatile memory such as read only memory (ROM) 231 and random access memory (RAM) 232. A basic input/output system 233 (BIOS), containing the basic routines that help to transfer information between elements within computing device 210, such as during start-up, is typically stored in ROM 231. RAM 232 typically contains data and/or program modules that are immediately accessible to and/or presently being operated on by processing unit 220. By way of example, and not limitation, FIG. 1 illustrates operating system 234, application programs 235, other program modules 236, and program data 237.

The computing device 210 may also include other removable/non-removable, volatile/nonvolatile computer storage media. By way of example only, FIG. 1 illustrates a hard disk drive 240 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 210. In FIG. 1, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 162 and pointing device 161, commonly referred to as a mouse, trackball, touch screen, or multi-touch input device. Other input devices (not shown) may include a microphone, joystick, game pad, satellite dish, scanner, Bluetooth interface, NFC scanner, RFID reader, movement sensor device such as the Microsoft Kinect or the like. These and other input devices are often connected to the processing unit 220 through a user input interface 160 that is coupled to the system bus, but may be connected by other interface and bus structures, such as a parallel port, game port or a universal serial bus (USB). A monitor 191 or other type of display device may also be connected to the system bus 221 via an interface, such as a video interface 190. In addition to the monitor, computers may also include other peripheral output devices such as speakers 197 and printer 196, which may be connected through an output peripheral interface 195.

The computing device 210 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computing device 210, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing device 210 is connected to the LAN 171 through a network interface or adapter 170. When used in a WAN networking environment, the computer 210 typically includes a modem 172 or other means for establishing communications over the WAN 173, such as the Internet. The modem 172, which may be internal or external, may be connected to the system bus 221 via the user input interface 160, or other appropriate mechanism. In a networked environment, program modules depicted relative to the computing device 210, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In one embodiment of the invention, in the case of a computer assigned for use by only one person, whenever that person leaves the vicinity of the computer, the computer can immediately go into a mode where the screen goes black, goes to a screen saver, or functionally goes into the 'Windows Lock' mode, for computers using the Windows operating system. Unlike the traditional screen saver mode, any other person who then attempts to activate the computer by, for example moving the mouse, or striking a key, will not cause reactivation of the computer in accordance with one embodiment. The return of this authorized user to within the designated detection range is the only method by which the computer will reactivate under this embodiment. The detection range can be quite large, such as several feet in this situation, but should not be large enough for the computer to remain active when the authorized user can no longer see the computer, in accordance with one embodiment.

In accordance with one embodiment, in the event that multiple users are authorized to use one or multiple computers, a first user to access a specific computer will have access to that computer and will continue to use that computer (or logged in) as long as he or she remains within a designated detection range. If that first moves out of the designated detection range, that computer then becomes available to any other authorized user, for example, a second user. Thus, if the second user then moves into the detection range, any subsequent activity on that computer will be correctly attributed to that second user. If the second user moves to within the detection range whilst the first user is also still within the detection range, the possibility of user collision exists. That issue is dealt with by the following two methods, in accordance with one embodiment. First, a user detection antenna may be mounted on the front edge of the keyboard of the computer to be accessed, and the authorized user may carry an NFC, RFID or Bluetooth low energy device embedded in a wrist band worn by that user. Thus the two devices (keyboard antenna and user device) are physically extremely close, and accordingly the designated detection range can be made extremely small, such as 6 inches. Hence the possibility of the second user getting within the detection range at the same time as the first user extremely small. Second, a warning, such as a 'pop up' window would appear indicating that the second user is now within the detection range, and providing the option to switch to the second user, or to keep the first user logged in. This would therefore eliminate the possibility of the first user's activity being erroneously attributed to the second user. It would also provide correct attribution of activity under the circumstance of an instructor assisting a user, whereby the correct attribution of activity will be whoever is actually entering the keystrokes.

Figure 2:
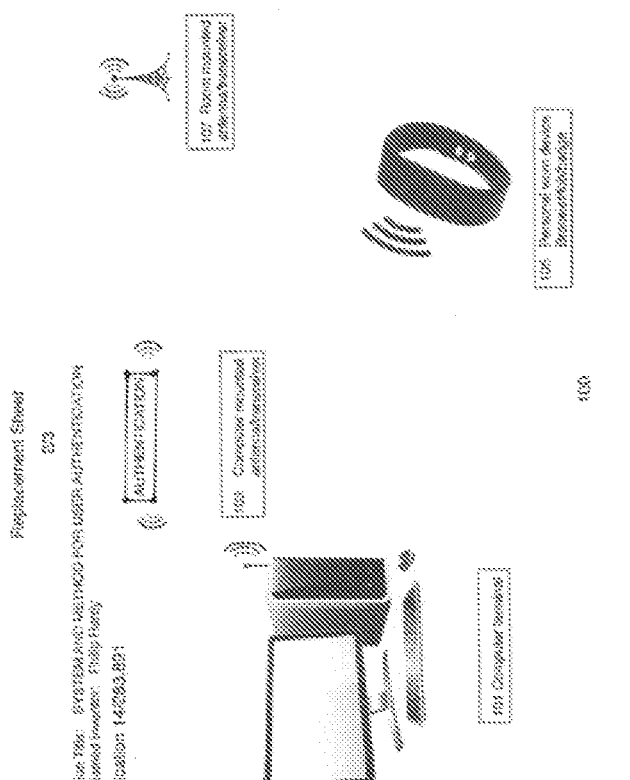
FIG. 2 illustrates the disclosed system in accordance with one embodiment.

In the embodiment illustrated in FIG. 2, the system 100 may include a computer terminal 101, a wireless transceiver 103, a wireless transceiver 105, and a wireless transceiver 107.

In one embodiment, computer terminal 101 may be implemented as system 200 in FIG. 1. Application modules or the operating system in the computer terminal 101 may include code to read user data received by the wireless transceiver 103 and use that data to manage the log in and log out processes described in the present disclosure which may be based on the ability of the transceiver 103 to detect the presence of transceiver 105 in the vicinity of the computer terminal 101. The transceiver 103 may be implemented as an USB device containing an RFID chip, as a Bluetooth interface, as an NFC interface, etc. In addition, while the embodiment illustrated shows the receiver being external to the computer terminal 101, persons of ordinary skill in the art will recognize that the transceiver 103 may be internal to the computer terminal 101.

The transceiver 105 may be carried around by a user and it may act in a radio beacon mode where it transmits user authentication data periodically which may be received by transceiver 107 or transceiver 103. Alternatively, the transceiver 105 may be interrogated by either transceiver 103 or transceiver 107, and in response to the interrogation, the transceiver may broadcast the user authentication data.

The user authentication data received through transceiver 103 may be processed by the computer terminal 101 in order to determine whether the user is in the vicinity of the computer terminal 101 and manage the log in/log out process. The transceiver 105 may be implemented as an RFID tag, NFC transceiver, or other type of wireless transceiver.

In an embodiment where the transmission range of the transceiver 103 or the transceiver 105 is limited, the transceiver 107 may be implemented as a transceiver with higher transmission power and detection sensitivity and serve as a relay to exchange communications between transceivers 103 and 105.

Figure 3:
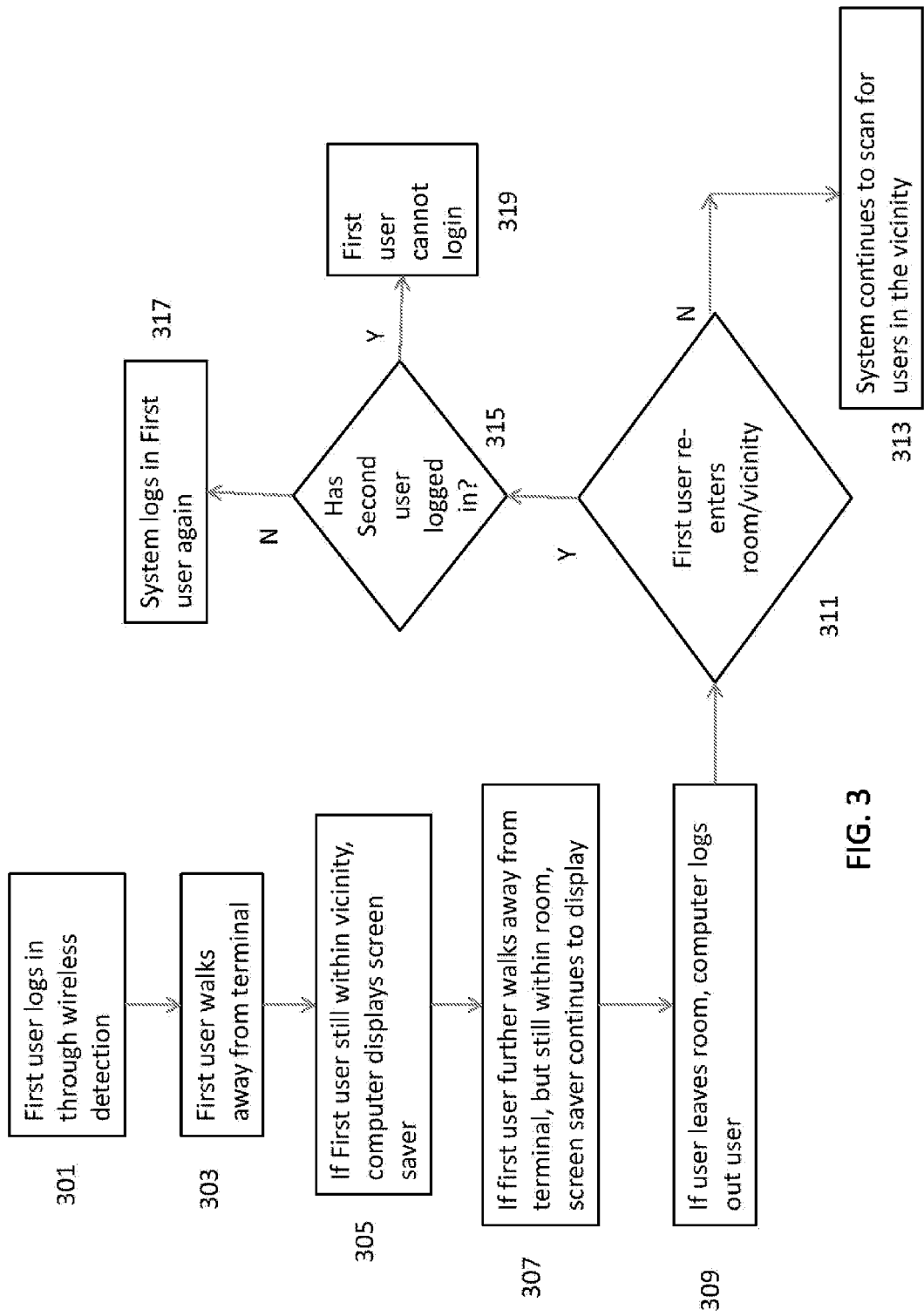
FIG. 3 illustrates a method for logging a user into a computer session or logging out of a computer session in accordance with one embodiment.

FIG. 3 illustrates a method for logging a user into a computer session or logging out of a computer session in accordance with one embodiment. In step 301, first user logs in through a wireless detection process. For example, the transceiver 103 detects a communication from transceiver 105 either directly or relayed through transceiver 107. In one embodiment, the system 100 continuously scans for transmissions from transceiver 105.

In step 303, the first user walks away from the terminal 101 and if the first user is still within the vicinity of the computer terminal, based on the detection of a signal transmitted by transceiver 105, the computer may display a screen saver (step 305). In step 307, if the first user further walks away from terminal 101, but the user is still determined to be within the room, the screen saver continues to display. In step 309, if the first user leaves the room, computer logs out the first user. In step 311, the system determines whether the first user re-enters the room or is again in the vicinity of terminal 101. If the first user does not re-enter the room, then in step 313 the system continues to scan for users in the vicinity of the terminal 101. If the first user does re-enter the room or is again within the vicinity of the computer terminal, then step 315 determines whether a second user has logged in. If no other user has logged in, then in step 317 the system logs in the first user again. If another user has logged in, then the first user is not allowed to log in (step 319).

In one embodiment, the solution disclosed herein involves use of an NFC or a near field electromagnetic transmitter worn or carried by the user, such as a fob, bracelet or ID badge, and a receiver, which is connected to the computer, such as a device which is powered by a USB connection.

In one embodiment, the user device is carried around by the user so that as soon as the user moves out of the immediate vicinity of the computer terminal, the computer may become disabled. Different levels of security may be selected by the user with differing levels of disablement of the computer based upon the time that the user is away from the computer, and the degree of security required. A typical level of security may be anticipated as requiring no more than the screen going black and/or the use of a screen saver.

In one embodiment, re-enablement of the computer may be instantaneous as soon as the user returns within range of a receiver connected to the computer. In one embodiment, the typical detection range would be approximately 3 to 6 feet such that an unauthorized attempt to access the computer would be immediately evident to the authorized user. Higher levels of security may entail additional steps to re-enable the computer based upon the time that the user has been away from the vicinity of the computer.

In one embodiment, the user device may include a power supply. A low power device may be used, depending on the desired range of coverage. Additional levels of security may be achieved through use of hopping or rolling codes such as those which are currently used in garage door openers which employ pseudo-random number generators.

In one embodiment, a single user device may emit a unique signal includes user authentication or identification data, and any number of computers may be programmed to allow access by that user in accordance with the present disclosure.

In a preferred embodiment, Bluetooth technology may be used by the user transceiver and there it is not necessary to have an antenna array or repeater in the rooms where the system is expected to be in use. With Bluetooth technology, the effective range can be from as little as 2 inches, and up to as much as 150 feet. In a preferred embodiment, use of the disclosed system may involve forcing the computer to display a screensaver as soon as the user becomes far enough from the computer so that the user is unable to use or reach the keyboard, which may also be too far away to effectively read the screen. This process would enable the computer to be HIPAA compliant, a standard that currently mandates a 30 minute lock out which is preset on the servers on the system whenever there is no activity for that length of time. The intent of that standard, is to prevent patient protected information from being accessed by unauthorized people. However, even the 30 minute lock out period may prove to be too long for it to be a hundred percent effective in preventing unauthorized access, whilst at the same time, it is still highly inconvenient for health care workers whose job is not merely to remain at the computer all day long. Similar concerns and lock out times apply in the field of education, with the goal of preventing students from accessing computers left unattended by teachers. Similar concerns and needs for safeguarding access to sensitive data apply in many other industries as well.

Many computers are already set up to function with Bluetooth devices, and the commonly available 'wireless' mouse, or trackpad use that technology. A computer that is not Bluetooth enabled may be modified by adding Bluetooth software, including, for example, a driver, and by adding a Bluetooth transceiver through an input/output interface, for example, through an USB port.

A one user, one computer scenario would be applicable to many office environments, and would enable the user to step away from the computer with no concern about anyone else being able to access any of the information in the user's absence, with the added convenience of the computer being immediately functional upon the user's return. Current technology allows the user to make the computers and tablet devices password protected, and to determine a lock out period after which the user has to unlock the device with the password. This, however, creates a conflict between security and usability. Use of the disclosed system eliminates that conflict because the presence of a user worn transceiver is all that is necessary for the computer/tablet to work.

Situations in which there are more than one user, and/or more than one computer, are those in which 'user collision' might arise, and this is especially true if the users and or computers are in close proximity to each other. There are at least three possible circumstances under which this situation can arise, and these are addressed in the subsequent paragraphs.

In a first scenario, one user can have access to different computers. This could apply to situations such as that of an administrator in an office, whereby that person might access many computers and possibly have access privileges specific to his/her security level. This user may access a computer assigned to another user with a lower security level or clearance. Under this circumstance the administrator's recognition by the system would supersede that of the normal user, and appropriate security level privileges would be enabled. As soon as the administrator steps away from the computer, the privileges revert back to those of the normal user level, and the computer remains enabled for the normal user, as long as he/she is within the predetermined range.

In a second scenario several users may share one computer. This situation is generally described in one embodiment above with reference to the Figures. For example, in an operating room the space is limited, so there may be room for only one computer which is typically accessed by multiple users. It this situation the disclosed system also provides an advantage over prior art systems by using a very short range of the transmitting user device, for example, so that even though other users may be in the same room, they are not near enough to the computer for it to recognize their presence.

In one embodiment, the disclosed system may include a transceiver receiver attached to the keyboard. This transceiver may include a strip antenna attached along the edge of the keyboard such that the operating range would be reduced to a minimum, and in this way, the user would have to have his or her hands on the keyboard for it to recognize the user's presence. This carries with it the additional benefit of requiring only an extremely low power transmitting device which would not only prolong the battery life of the device, but also address any potential radiation concerns, since the output of this device would be a mere fraction of that of a cell phone. Other options with regard to the placement of the antenna receiving device include it being incorporated in a wrist rest which is often used in front of the keyboard, or within a pad upon which the keyboard rests.

Another option with regard to identifying the correct user in high traffic situations is to use an embodiment of the disclosed system where beam technology is applied. For example, the transceiver device on the computer may include a directional antenna so that its detection and/or power radiation is greater in one or more directions. In this manner, even if two users were present within the operating range of the computer transceiver, the system may only recognize the user who is directly in front of the computer, in accordance with one embodiment.

In a third scenario, different users may share different computers. This situation is already seen in hospitals, where physicians and nurses access whichever computer is available at any particular moment, with the computers being potentially just inches away from each other. The keyboard transceiver described above can also be used to solve user collision in this situation. In one embodiment, the already existing software included in the 'Tap-In, Tap-out', program may also be installed in the system of the present invention, with the detection scheme described herein overriding the access through the Tap-In, Tap-out system, such that the resulting system in effects implements an access hierarchy, whereby users may be restored to a previous session.

In one embodiment, when a user walks away from a computer the computer screen goes black, instead of either displaying a screen saver or logging the user out. This will result in energy savings, considering the hundreds of thousands of computers currently in use. It would also serve to prevent alerting a passerby to that computer being in use at all. In one embodiment, a person stealing a computer equipped with the software and devices disclosed herein would first have to break the Bluetooth code to enable the computer to function, and Bluetooth technologies already have several different levels of security available to address these situations. The computer could also be programmed with other security safety mechanisms to disable use of the computer when an expected transmission is not received within a specified amount of time.

As far as the different levels of security are concerned, the options would depend upon the sensitivity of the data that is on the computer, and the scenario described herein would be appropriate for moderate level security needs, such as healthcare and education. Under those circumstances, given the different degrees to which the computer shuts down, and the increasing complexity of the steps required to reactivate the computer, could be nothing more than time dependent. So, for example, the screen goes black as soon as the Bluetooth is no longer detected by the computer. Then, after 10 minutes, the hard drive goes into idle, and after 30 minutes it shuts down and after an hour additional and possibly administrator level intervention is required before the computer can be reactivated. All of this may depend upon the specific work environment and the time of day, such that if the computer operator goes absent during normal work hours the response would be different, than for example, at the lunch hour, when employees are expected to be away from the computer. Variances of this level could be anticipated for personal devices, such as laptops and tablets.

In one embodiment of the present invention, where higher levels of security are required, the disclosed system may include different repeater detectors in various locations and time logouts may also be incorporated. For example, several detectors may be placed in various doorways so that the system response becomes dependent upon the time of day, and the location of the receiver devices (software implementing RFID tracking or the like may be incorporated into the disclosed system). In this manner, the location of various employees or users may be tracked, as well as any unexpected variances, enabling different system responses. In the situation where the system safeguards against unauthorized access of very highly sensitive information, the user transceiver device may be detected in a defined area of a building before the computer can be accessed. Thus, even if the computer and/or the computer transceiver is stolen, resident programs on the computer may destroy sensitive data if the computer is activated without the authorized user transceiver device being detected in the building at the expected location, at that same time as the computer is being accessed. In other words, if someone steals a computer, it will be prevented from working by this system because the computer can be set to only work when it is receiving Bluetooth signals from the room where it is supposed to be kept. This additional layer of security would be in addition to the bluetooth transmitter that the user would have on their person to enable the computer to become operational by their presence.

The foregoing description of possible implementations consistent with the present invention does not represent a comprehensive list of all such implementations or all variations of the implementations described. The description of only some implementation should not be construed as an intent to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention. It is thus intended that the specification and examples be considered as exemplary only.

What is claimed is:

1. A method of managing access to a computing session comprising:
   detecting, by said computing device through a directional beam antenna a plurality of transceivers corresponding to a plurality of users in a vicinity;
   receiving, by said directional beam antenna mounted on or near a keyboard of a computing device, a user ID data transmitted wirelessly by transceiver in said vicinity of said directional beam antenna, wherein said user ID data corresponding to a user of said plurality of users;
   determining, by said computing device through said directional beam antenna, said transceiver is in a vicinity of 6 inches or less;
   determining, by said computing device through said directional beam antenna, said transceiver is positioned directly in front of said computing device;
   after determining said transceiver is in said vicinity, authenticating, by said computing device, said user ID data;
   logging in said user into said computing device based on said authentication;
   wherein said transceiver is embedded in a bracelet or wrist band worn by said user;
   wherein said transceiver comprises at least one of: NFC device; RFID device; or Bluetooth device;
   detecting, by said computing device through said directional beam antenna, transceiver is no longer in said vicinity of said directional beam antenna; and
   responding to said detection, said computing device display a black screen or screen saver for a certain period of time and then logout said user;
   detecting, by said computing device said transceiver back in vicinity of at least of 3 to 6 feet, wherein detection is based on receiving said user ID data;
   authenticating again, by said computing device, said user ID data;
   logging in said user into said computing device in said vicinity of 3 to 6 feet based on said authentication.

* * * * *